United States Patent [19]

Mathis et al.

[11] 4,413,081

[45] Nov. 1, 1983

[54] POLYMER STABILIZATION

[75] Inventors: Ronald D. Mathis; Jerry O. Reed, both of Bartlesville, Okla.

[73] Assignee: Phillips Petroleum Company, Bartlesville, Okla.

[21] Appl. No.: 462,848

[22] Filed: Feb. 1, 1983

[51] Int. Cl.³ .............................................. C08K 5/39
[52] U.S. Cl. .................................... 524/202; 524/609
[58] Field of Search ............................... 524/202, 609

[56] References Cited

U.S. PATENT DOCUMENTS

| 2,465,513 | 3/1949 | Carasso | 524/202 |
| 3,386,950 | 6/1968 | Horvath et al. | 260/45.7 |
| 3,519,596 | 7/1970 | Ellerstein | 524/609 |
| 3,531,434 | 9/1970 | Isaac | 260/45.75 |
| 3,578,625 | 5/1971 | Nakashio et al. | 260/45.75 |
| 3,919,177 | 11/1975 | Campbell | 528/388 |
| 4,076,689 | 2/1978 | Mills | 260/45.75 |
| 4,255,321 | 3/1981 | Brussen | 260/45.75 |

OTHER PUBLICATIONS

A. H. Frazer, "High Temperature Resistant Polymers", 1968, pp. 123–127, Interscience Pub. N.Y., N.Y.

*Primary Examiner*—V. P. Hoke

[57] ABSTRACT

The heat stability of arylene sulfide polymers, such as poly(p-phenylene sulfide), is improved by the addition of cure retarders comprising Group 8 metal dihydrocarbyldithiocarbamates.

12 Claims, No Drawings

POLYMER STABILIZATION

FIELD OF INVENTION

This invention relates to improving the characteristics of arylene sulfide polymer compositions. In accordance with another aspect, this invention relates to the use of cure retarders in poly(arylene sulfide) polymer compositions. In accordance with another aspect, this invention relates to the use of cure retarders and heat stabilizers in poly(arylene sulfide) polymer compositions to retard cross-linking or substantial alteration of physical properties during heating. In accordance with a further aspect, this invention relates to the use of selected stabilizers to improve the heat stability of arylene sulfide polymer compositions, especially poly(p-phenylene sulfide) polymers. In accordance with a further aspect, this invention relates to improving the heat stability of fiber and film grade poly(p-phenylene sulfide) polymers by the addition of a cure retarder or stabilizer.

BACKGROUND OF THE INVENTION

In applications, such as in the production of fibers and films from arylene sulfide polymers, it is desirable that the melt flow and molecular weight of the polymer remain substantially unchanged during processing of the polymer. Various procedures have been utilized to stabilize arylene sulfide polymers against changes in physical properties during processing. It has now been discovered that arylene sulfide polymers can be treated in a manner such that the polymer properties remain substantially unchanged during heating of the polymer by incorporating into the polymer a cure retarder.

Accordingly, an object of this invention is to provide a process for improving the heat stability of arylene sulfide polymers.

A further object of this invention is to provide an improved process for stabilizing the physical properties, especially melt flow and molecular weight, of arylene sulfide polymers during processing.

A further object of this invention is to provide arylene sulfide polymers having improved physical properties with respect to melt flow and molecular weight, in particular.

A further object of this invention is to provide phenylene sulfide polymers exhibiting improved heat stability.

Other objects, aspects, and the several advantages of the invention will be apparent to those skilled in the art upon a study of the specification and the appended claims.

SUMMARY OF THE INVENTION

According to the invention, the heat stability of arylene sulfide polymers is improved by the addition of an effective stabilizing amount of at least one Group 8 dihydrocarbyldithiocarbamate which retards curing and cross-linking of the resin during heating.

In accordance with another embodiment of the invention, the heat stability of poly(arylene sulfide) polymers, for example, poly(p-phenylene sulfide) polymers, is improved by incorporating therein prior to heating to processing conditions an effective stabilizing amount of at least one Group 8 dihydrocarbyldithiocarbamate to retard curing and cross-linking during heating and processing of the polymer.

In accordance with still another embodiment of the invention, the heat stability of film or fiber grade poly(p-phenylene sulfide) polymers is improved by the addition of Group 8 dihydrocarbyldithiocarbamate.

In accordance with a specific embodiment of the invention, minor amounts of Group 8 dihydrocarbyldithiocarbamate, e.g. nickel dibutyldithiocarbamate (BTN) at about 0.1 weight percent, admixed with poly(p-phenylene sulfide) (PPS) provides a cure retarding effect (stabilizing effect) based on the storage modulus results obtained with a Rheometric Dynamic Spectrometer. For example, PPS alone increases in storage modulus at 300° C. by 105 percent. At the same conditions, the PPS-nickel dibutyldithiocarbamate (BTN) composition of the invention increased only 11 percent whereas a PPS-zinc dibutyldithiocarbamate (BTZ) comparison composition increased 121 percent.

DESCRIPTION OF THE PREFERRED EMBODIMENTS

The invention is applicable for use with any normally solid, heat curable, high molecular weight arylene sulfide polymer that can be formed into fiber and film. Arylene sulfide polymers which can be employed in the process of this invention include arylene sulfide polymers which have a melt flow of at least about 20 and generally within the range of about 50 to about 400 and higher (determined by the method of ASTM D 1238-70, modified to a temperature of 316° C. using a 5-kg weight, the value being expressed as g/10 min.). Thus, the arylene sulfide polymers can be linear, branched or lightly cross-linked. Although the method by which the polymers of this description are produced is not critical, preferably the polymer employed in the process is prepared by use of polyhaloaromatic compounds, alkali metal sulfides, and organic amides. For example, the arylene sulfide polymers for use in this invention can be produced by the method of U.S. Pat. No. 3,354,129 which is hereby incorporated by reference. The preferred type polymer employed for use in fiber and film applications is prepared by use of a p-dihalobenzene, an alkali metal sulfide, an organic amide, and an alkali metal carboxylate as in U.S. Pat. No. 3,919,177. The disclosure of U.S. Pat. No. 3,919,177 is hereby incorporated by reference.

The cure retarders or cure stabilizers of the invention can be any of the iron group dihydrocarbyldithiocarbamates.

The Group 8 dihydrocarbyldithiocarbamates can be expressed as

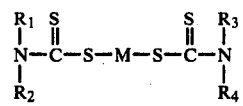

wherein $R_1$, $R_2$, $R_3$, $R_4$ individually represent hydrocarbyl groups having from 1 to about 20 carbon atoms, preferably from 1 to about 6 carbon atoms, and M is a Group 8 iron group element, i.e., iron, nickel or cobalt, preferably nickel. The hydrocarbyl groups include acyclic hydrocarbon radicals having from 1 to about 20 carbon atoms or a cyclic hydrocarbon radical having from 5 to 20 carbon atoms. The most preferred compounds include the metal dialkyldithiocarbamates having from 1 to about 6 carbon atoms per alkyl group.

Specific representative examples of such compounds include:
iron dimethyldithiocarbamate iron dieicosyldithiocarbamate
cobalt dibutyldithiocarbamate
cobalt dicyclohexyldithiocarbamate
nickel diethyldithiocarbamate
nickel dibutyldithiocarbamate (presently preferred)
nickel dicyclopentyldithiocarbamate
nickel diphenyldithiocarbamate
nickel dinaphthyldithiocarbamate
nickel dieicosyldithiocarbamate and the like, and mixtures thereof.

The amount of cure retarder incorporated into the arylene sulfide resin will be a finite, effective amount sufficient to improve the heat stability of the polymer. In general, the cure retardant additives of this invention are employed in an amount within the range of about 0.01 to about 5, preferably about 0.05 to about 2 percent based on the weight of the arylene sulfide polymer.

In addition to the cure retardant additives of this invention, the compositions can contain other ingredients conventionally employed in arylene sulfide polymer compositions formed into fibers and films. For instance, fillers such as zinc oxide, pigments, resins, and/or plasticizers, and the like can be present so long as the particle size is small enough to permit passage of polymer through the processing equipment during formation of fibers and films.

The cure retarder can be incorporated into the arylene sulfide polymer at any stage of processing, preferably prior to being subjected to elevated temperature, or at such times as it is desired to retain melt flow stability. In one practical application of the invention, the cure retarders are incorporated into the arylene sulfide resin, such as a poly(p-phenylene sulfide) polymer, prior to melt spinning to form fibers or other formed articles so that gel formation is reduced during melt spinning and problems with filter and spinneret plugging is reduced or obviated.

The processes of this invention of incorporating the cure retarder into the polymer can be conducted batchwise or continuously.

The following example is intended to illustrate the compositions and process of the invention.

EXAMPLE

Sample Preparation, Test Method And Results

A series of samples was prepared by mixing individual portions of linear poly(p-phenylene sulfide), abbreviated PPS, with the specific metal compound, when employed. The PPS was produced in the manner disclosed in U.S. Pat. No. 3,919,177. The recovered polymer was in the form of a powder (fluff) having a melt flow of 250 g/10 minutes as determined in accordance with ASTM D 1238-70, modified to a temperature of 316° C. and using a 5 kg weight.

The procedure consisted of mixing 15 g of the PPS powder with 0.15 g of the metal compound (0.1 weight percent) which was dissolved in about 50 cc of acetone. The solvent was removed from each mixture at ambient conditions in a fume hood, e.g. overnight or longer, if necessary. The dried powders were stirred and additionally dried in a vacuum oven at room temperature (about 23° C.) for approximately 2 hours.

Discs measuring 1×0.25 inches (2.54×0.64 cm) were pressed from about 2.5 g of each sample at room temperature by employing a mold and a laboratory press using a platen pressure of about 10,000 psig (69 MPa). Each disc was subsequently melted and converted into a test button by compression molding at 325° C. The molding cycle typically comprised 2½ minutes at a platen pressure of about 5,000–10,000 psig (34–69 MPa) and about 2½ minutes at a platen pressure of about 30,000 psig (207 MPa). While maintaining the latter pressure, heating was discontinued and cooling initiated by circulating tap water through the platens. When the mold temperature reached about 121° C., the pressure was released and the test button removed from the mold. The finished buttons measured about 1×0.1875 inches (2.54×0.48 cm).

Each button was evaluated for changes in degree of crosslinking or melt viscosity in a test employing a Rheometric Dynamic Spectrometer (RDS), available from Rheometrics, Inc. The test, which determined storage modulus as a function of time at a constant shear of 10 radians per second at 300° C. is useful in evaluating the thermal stability of the sample, e.g. crosslinking propensities can be determined.

The apparatus comprises two 1 inch diameter stainless steel plates, the bottom plate connected to a sensing device while the top plate can be horizontally oscillated. The test button is placed between the plates which have been preheated to 300° C. As the sample starts to melt it is squeezed to a thickness of 2 mm. Excess material is removed and the sample is allowed to thermally equilibrate for 3 minutes. The top plate is then oscillated at 10 radians per second with 10 percent strain. Readings are recorded every minute for 20 minutes as dynes per square centimeter. The percent difference between the 2 minute reading or 6 minute reading and the 20 minute reading is interpreted as indicating the thermostability of the sample. A percent increase indicates crosslinking may be occurring. The larger the value the greater the degree of crosslinking since storage modulus is directly proportional to polymer viscosity. By comparing the results obtained with PPS containing no additive with PPS samples containing an additive it becomes possible to assess the effect of the additive on the crosslinking process, e.g. it can function as a cure retarder, cure promoter or have essentially no effect. The compounds of this invention, e.g. the Group 8 dihydrocarbyldithiocarbamates, function as cure retarders with the curing condition employed. That is the compounds can essentially eliminate or greatly reduce any curing of the arylene sulfide polymer under the conditions of temperature and shear used.

The test series consisted of 3 samples. Sample 1 was a control containing no metal dithiocarbamate, sample 2 was a comparison employing as the metal compound, 0.1 weight percent of zinc dibutyldithiocarbamate (BTZ) and sample 3, the invention run, utilized 0.1 weight percent of nickel dibutyldithiocarbamate (BTN) as an illustration of the preferred metal compounds. The results are set forth in the following Table.

TABLE

Influence Of Metal Dihydrocarbyldithiocarbamate On Storage Modulus

| Run No. | Metal Compound | Sample Melt Flow g/10 min | Storage Modulus (SM), Dynes/cm$^2$ | | | | $\dfrac{SM_{20} - SM_6}{SM_6} \times 100$ |
|---|---|---|---|---|---|---|---|
| | | | 2 min | 6 min | 20 min | $SM_{20} - SM_6$ | |
| 1 | None (control) | 250 | 1020 | 1140 | 2340 | 1200 | 105 |
| 2 | BTZ (comparison) | 402 | 790 | 900 | 1990 | 1090 | 121 |
| 3 | BTN (invention) | 356 | 1180 | 1050 | 1170 | 120 | 11 |

The results indicate that both BTZ and BTN initially function as cure retarders for PPS based on the increased melt flow values (402 and 356, respectively) shown for samples 2 and 3 relative to the melt flow of 250 obtained for the control. However, in the sample evaluation with the RDS, a distinct difference in results is noted with an invention metal dihydrodithiocarbamate (BTN) as compared to a non-invention metal dihydrodithiocarbamate (BTZ) and with the control absent any metal dithiocarbamate.

The control sample is being cured under the test conditions employed based on the increase in storage modulus values over the time span of 2 minutes to 20 minutes from 1020 dynes/cm$^2$ to 2340 dynes/cm$^2$. Storage modulus is directly related to polymer viscosity and therefore to polymer molecular weight and/or to the effects of crosslinking which may be taking place. The higher the storage modulus value the higher the polymer molecular weight or the higher the degree of crosslinking, for example. The percentage increase in the storage modulus of the control sample from minute 6 into the test to minute 20 (termination of test) is determined to be 105 percent.

The results obtained in prior determinations suggest that thermal equilibration of the test sample is reliably achieved after about 6 minutes into the test. The results obtained in the last 14 minutes of the test are believed to be of the most value and are useful in evaluating the effects of various additives on the curing behavior of arylene sulfide polymer compositions.

The increase of 121 percent obtained with the non-invention metal dithiocarbamate of run 2 is slightly higher than that of control run 1. However, its storage modulus value of 1990 dynes/cm$^2$ after 20 minutes is somewhat lower than the storage modulus value of 2340 dynes/cm$^2$ for the control sample of run 1. This suggests that the polymer of run 2 is lower molecular weight or less crosslinked than the control polymer of run 1 after 20 minutes in this test.

In contrast with the other samples, the invention composition displays remarkably little change in storage modulus values from 2 to 20 minutes. Thus, the increase in storage modulus incurred in the last 14 minutes of the test is only 11 percent. Moreover, the value of 1170 dynes/cm$^2$ obtained after 20 minutes in the test is only 50% that of the control sample and about 59% that of the composition sample. The presence of 0.1 weight percent BTN is shown to have essentially eliminated any curing of PPS under the temperature and shear conditions employed.

We claim:

1. A polymer composition exhibiting improved heat stability comprising a major amount of an arylene sulfide polymer containing a small effective stabilizing amount sufficient to retard polymer curing and cross-linking of at least one Group 8 metal dihydrocarbyldithiocarbamate.

2. An article of manufacture formed from the composition of claim 1.

3. A fiber or film formed from the composition of claim 1.

4. A composition according to claim 1 wherein the amount of stabilizer present ranges from about 0.01 to about 5 weight percent based on the weight of the arylene sulfide polymer.

5. A composition according to claim 4 wherein said arylene sulfide polymer is a poly(p-phenylene sulfide) having a melt flow of about 50 to about 400.

6. A composition according to claim 1 wherein said dithiocarbamate is represented by the formula

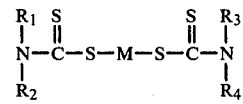

wherein $R_1$, $R_2$, $R_3$ and $R_4$ individually represent hydrocarbyl groups having from 1 to about 20, inclusive, carbon atoms, and M is iron, nickel, or cobalt.

7. A composition according to claim 6 wherein said arylene sulfide polymer is poly(p-phenylene sulfide) and said dithiocarbamate is nickel dibutyldithiocarbamate.

8. A method for improving the heat stability of poly(arylene sulfide) polymers which comprises incorporating therein a small effective stabilizing amount of a Group 8 metal dihydrocarbyldithiocarbamate which amount is sufficient to retard curing and cross-linking of said polymer during heating.

9. A method according to claim 8 wherein the amount of said stabilizer ranges from about 0.01 to about 5 weight percent based on the weight of said polymer.

10. A process according to claim 8 wherein said polymer is poly(p-phenylene sulfide).

11. A method according to claim 11 wherein said dithiocarbamate is represented by the formula

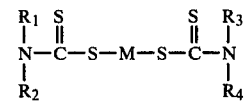

wherein $R_1$, $R_2$, $R_3$ and $R_4$ individually represent hydrocarbyl groups having from 1 to about 20, inclusive, carbon atoms, and M is iron, nickel, or cobalt.

12. A method according to claim 11 wherein said arylene sulfide polymer is poly(p-phenylene sulfide) and said dithiocarbamate is nickel dibutyldithiocarbamate.

* * * * *